(12) United States Patent
Liu et al.

(10) Patent No.: US 10,830,471 B2
(45) Date of Patent: Nov. 10, 2020

(54) HEATING CONTROL METHOD AND DEVICE FOR AIR CONDITIONER

(71) Applicant: QINGDAO HAIER AIR CONDITIONER GENERAL CORP., Qingdao (CN)

(72) Inventors: Juke Liu, Qingdao (CN); Beibei Xu, Qingdao (CN); Guojing Xu, Qingdao (CN)

(73) Assignee: QINGDAO HAIER AIR CONDITIONER GENERAL CORP., LTD., Qingdao (CN)

( * ) Notice: Subject to any disclaimer, the term of this patent is extended or adjusted under 35 U.S.C. 154(b) by 24 days.

(21) Appl. No.: 16/475,042

(22) PCT Filed: Mar. 5, 2018

(86) PCT No.: PCT/CN2018/078042
§ 371 (c)(1),
(2) Date: Jun. 28, 2019

(87) PCT Pub. No.: WO2018/177080
PCT Pub. Date: Oct. 4, 2018

(65) Prior Publication Data
US 2019/0323716 A1    Oct. 24, 2019

(30) Foreign Application Priority Data
Mar. 30, 2017    (CN) .......................... 2017 1 0199529

(51) Int. Cl.
*F24F 11/30* (2018.01)
*F24F 11/64* (2018.01)
(Continued)

(52) U.S. Cl.
CPC .............. *F24F 11/30* (2018.01); *F24F 11/64* (2018.01); *F24F 11/83* (2018.01); *G05B 6/02* (2013.01);
(Continued)

(58) Field of Classification Search
CPC .. F24F 11/30; F24F 11/64; F24F 11/83; F24F 2110/10; F24F 2110/12; F24F 2140/20;
(Continued)

(56) References Cited

U.S. PATENT DOCUMENTS 10,655,886 B2 *   5/2020   Ikeda ....................... F24F 11/89
2012/0101648 A1 *   4/2012   Federspiel ......... H05K 7/20836
                                                                  700/291
(Continued)

FOREIGN PATENT DOCUMENTS

CN     102734994     10/2012
CN     104697109      6/2015
(Continued)

*Primary Examiner* — Ziaul Karim
(74) *Attorney, Agent, or Firm* — Jiwen Chen; Jacobson Holman PLLC (57) ABSTRACT

An air conditioner heating mode control method includes: obtaining an indoor temperature and comparing the indoor temperature with a first indoor temperature threshold as an air conditioner running at the heating mode; performing a dual PID control process if the indoor temperature is less than or equal to the first indoor temperature threshold. The dual PID control process obtains an indoor temperature difference; performs a PID calculation according to the indoor temperature difference to obtain a first target frequency; obtains a coil temperature difference; performs a PID calculation according to the coil temperature difference to obtain a second target frequency; compares the first and second target frequencies; and performs a frequency control on the compressor in which the greater one between the first target frequency and the second target frequency is used as
(Continued)

the target frequency. The present invention includes an air conditioner heating mode control device.

6 Claims, 2 Drawing Sheets

(51) Int. Cl.
  *F24F 11/83* (2018.01)
  *G05B 6/02* (2006.01)
  *F24F 110/10* (2018.01)
  *F24F 110/12* (2018.01)
  *F24F 140/20* (2018.01)
(52) U.S. Cl.
  CPC ....... *F24F 2110/10* (2018.01); *F24F 2110/12* (2018.01); *F24F 2140/20* (2018.01); *F25B 2400/077* (2013.01)
(58) Field of Classification Search
  CPC .... F24F 2110/00; G05B 6/02; F25B 2400/77; F25B 2500/26; F25B 2600/0253; F25B 2700/2104; F25B 49/022; Y02B 30/70
  See application file for complete search history.

(56) References Cited

U.S. PATENT DOCUMENTS

| | | | |
|---|---|---|---|
| 2012/0212166 A1* | 8/2012 | Merkel | F04D 27/004 |
| | | | 318/400.08 |
| 2014/0266755 A1* | 9/2014 | Arensmeier | F24F 11/62 |
| | | | 340/679 |
| 2016/0238301 A1* | 8/2016 | Denton | F24F 11/30 |

FOREIGN PATENT DOCUMENTS

| | | |
|---|---|---|
| CN | 104764150 | 7/2015 |
| JP | H09310927 | 12/1997 |
| KR | 20010047639 | 6/2001 |
| KR | 20050034084 | 4/2005 |

* cited by examiner

HEATING CONTROL METHOD AND DEVICE FOR AIR CONDITIONER

This is a U.S. national stage application of PCT Application No. PCT/CN2018/078042 under 35 U.S.C. 371, filed Mar. 5, 2018 in Chinese, claiming priority of Chinese Application No. 201710199529.4, filed Mar. 30, 2017, which is hereby incorporated by reference.

FIELD OF THE INVENTION

The present invention relates to the field of air conditioning technology, and more particularly to the control of an air conditioner, and more particularly to an air conditioner heating control method and a control device.

DESCRIPTION OF THE RELATED ART

An air conditioner unit helps to regulate the temperature of a room during cold weather. Some units even play an important role in those places where no heating systems are provided or in these days when the central heating system finishes its annual working but the weather is still cold.

The heating operation logic of the air-conditioner is fully built-in inside the system. The system gets inputs from the user (e.g. desired comfort temperature) and from the surroundings (e.g. real-time indoor temperature), and according to the difference between the desired comfort temperature and the real-time indoor temperature it implements its logic to calculate a target frequency of the compressor for getting to the desired comfort conditions. One of the disadvantages of an air-conditioner is that if the target frequency calculated by the built-in logic is comparatively below the required level, the increasing of the room temperature will be very slow. The room temperature could not reach the indoor requirements even it starts working for a long period. The lower real-time indoor temperature needs the longer working time of the air conditioner. The heating effect is far from satisfaction.

Therefore, how to reach the desired indoor environment in a shorter time becomes a key factor of heating performance of an air conditioner.

SUMMARY OF THE INVENTION

One aspect of the present invention is to provide an air conditioner heating mode control method in order to solve the problem that the user may feel comfortable due to a slow temperature increase rate.

In order to achieve the above object, the air conditioner heating mode control method provided by the present invention is implemented through the following technical solutions:

An air conditioner heating mode control method includes:
obtaining an indoor temperature and comparing the indoor temperature with a first indoor temperature threshold as an air conditioner running at the heating mode;
performing a dual PID control process if the indoor temperature is less than or equal to the first indoor temperature threshold; wherein the dual PID control process including:
calculating the difference between the indoor temperature and a set indoor target temperature to obtain a indoor temperature difference; performing a PID calculation according to the indoor temperature difference to obtain a first target frequency; obtaining a coil temperature of an indoor unit heat exchanger; calculating the temperature difference between the coil temperature and a coil target temperature to obtain a coil temperature difference; performing a PID calculation according to the coil temperature difference to obtain a second target frequency; comparing the first target frequency obtained in the indoor temperature PID calculation with the second target frequency obtained in the coil temperature PID calculation; and performing a frequency control on the compressor in which the greater one between the first target frequency and the second target frequency is used as the target frequency; wherein the coil target temperature is determined according to the indoor temperature, wherein the coil target temperature is negatively correlated with the indoor temperature.

Performing a room temperature PID control process if the indoor temperature is greater than the first indoor temperature threshold; wherein the room temperature PID control process includes:
performing a frequency control on the compressor in which the first target frequency is used as the target frequency;

The control method as described above, the method further comprises:
during the dual PID control process further includes: obtaining the indoor temperature in real time; comparing the indoor temperature with a second indoor temperature threshold; wherein the second indoor temperature threshold is greater than the first indoor temperature threshold;
if the indoor temperature is greater than the second indoor temperature threshold, terminating the dual PID control process.

Performing a room temperature PID control as the dual PID control process is being terminated; wherein the room temperature PID control process includes:
performing a frequency control on the compressor in which the first target frequency is used as the target frequency.

In the control method as described above, the procedures for determining the coil target temperature according to the indoor temperature including:
obtaining a recommended indoor temperature and a recommended coil target temperature;
calculating the difference between the recommended indoor temperature and the indoor temperature to obtain a first difference;
obtaining a second difference according to a relation: the second difference=a * the first difference, wherein a is a positive number not greater than 1;
calculating the sum of the recommended coil target temperature and the second difference as the coil target temperature for performing the coil temperature PID calculation.

Another aspect of the present invention provides an air conditioner heating mode control device.

An air conditioner heating mode control device, the device includes:
an indoor temperature obtaining unit configured to obtain an indoor temperature;
a coil temperature obtaining unit configured to obtain a coil temperature of an indoor unit heat exchanger;
a room temperature PID calculation unit configured to calculate the temperature difference between the indoor temperature and a set indoor target temperature to obtain an indoor temperature difference; and to perform a room temperature PID calculation according to the indoor temperature difference to obtain and output a first target frequency;
a coil temperature PID calculation unit configured to calculate a temperature difference between the coil temperature and a coil target temperature to obtain a coil temperature difference; and to perform a coil temperature PID calculation according to the coil temperature difference to obtain and output a second target frequency; the coil target temperature is determined according to the indoor temperature; the coil target temperature is negatively correlated with the indoor temperature;

a temperature comparison unit configured to compare the indoor temperature with an indoor temperature threshold; and a dual PID control unit configured to perform a frequency control on the compressor in which the greater one between the first target frequency and the second target frequency is set as the target frequency for the compressor as the output of the temperature comparison unit is that the indoor temperature is not greater than a first indoor temperature threshold.

The control device as described above, the device further comprising:

a room temperature PID control unit configured to perform a frequency control on the compressor in which the first target frequency is set as the target frequency for the compressor as the output of the temperature comparison unit is that the indoor temperature is greater than the first indoor temperature threshold.

As the dual PID control unit performing the dual PID control process, the indoor temperature obtaining unit keeps obtaining the indoor temperature; if the output of the temperature comparison unit is that the indoor temperature is greater than the second indoor temperature threshold, the dual PID control unit terminates; wherein the second indoor temperature threshold is greater than the first indoor temperature threshold.

The control device as described above, the device further comprising:

the room temperature PID calculation unit is configured to perform a frequency control on the compressor in which the first target frequency is set as the target frequency for the compressor as the output of the temperature comparison unit is that the indoor temperature is greater than the second indoor temperature threshold and the dual PID control unit is being terminated.

The control device as described above further includes:

a recommended indoor temperature obtaining unit configured to obtain a recommended indoor temperature;

a recommended coil target temperature obtaining unit configured to a recommended coil target temperature;

a first difference calculation unit configured to obtain a first difference which is the temperature difference between the recommended indoor temperature and the indoor temperature;

a second difference calculation unit configured to obtain a second difference according to a relation in which the second difference=a* the first difference, wherein a is a positive number not greater than 1; and a coil target temperature determining unit configured to calculate the sum of the recommended coil target temperature and the second difference and set the sum of the recommended coil target temperature and the second difference as the coil target temperature for performing the coil temperature PID calculation; and output the coil target temperature to the coil temperature PID calculation unit.

Effects of the Invention

Compared with the prior art, in the air conditioner heating mode control method disclosed by the present embodiment, indoor temperature threshold is provided. As the air conditioner working at heating mode, if the indoor temperature is not greater than the first indoor temperature threshold, performing a dual PID control process, in which it is preferably to select a higher target frequency between outputs of the indoor temperature PID calculation and the coil temperature PID calculation. In this way, on one hand, the compressor could run at a higher frequency as the indoor environment at comparatively low temperatures, with which the room could become warmer in a shorter time to a desired temperature; on the other hand, the aim of the control program could be set as a comparatively high set coil target temperature due to the negative correlation, which prevents the output air temperature from being far too low. Hence, with the control method, the problem that the room temperature could not reach the indoor requirements even it starts working for a long period or the low outlet air temperature could be solved. Moreover, the coil target temperature set in the coil temperature PID calculation is based on the indoor temperature and the two are negatively correlated: the lower the room temperature is measured, the higher the coil target temperature is set; if the indoor temperature is far from the desired temperature, the rate of temperature increase and outlet air temperature increase will be accelerated to enable the user to feel more comfort.

Advantages and features of the present disclosure and methods for accomplishing the same will be more clearly understood from exemplary embodiments described below with reference to the accompanying drawings.

DETAILED DESCRIPTION OF THE EMBODIMENTS

The present invention will be further described in detail below with reference to the accompanying drawings and embodiments.

Figure 1:
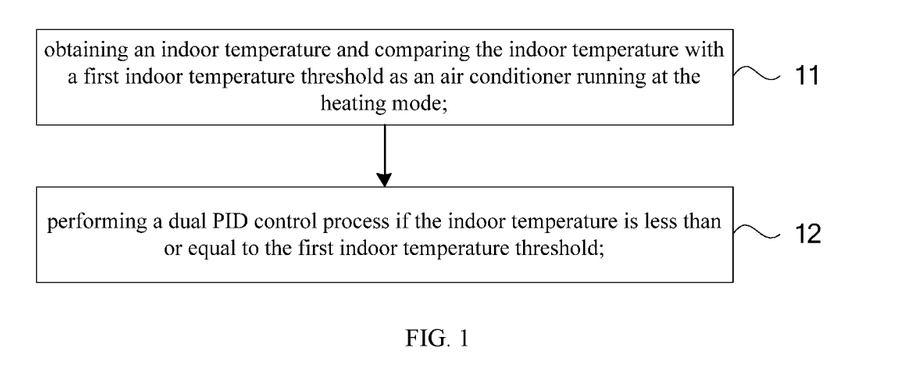
FIG. 1 is a flow chart of an air conditioner heating mode control method according to an embodiment of the present invention.

FIG. 1 is a flow chart of an air conditioner heating mode control method according to an embodiment of the present invention.

As shown in FIG. 1, the air conditioner heating mode control method includes:

Step 11: obtaining an indoor temperature and comparing the indoor temperature with a first indoor temperature threshold as an air conditioner running at the heating mode.

Wherein the indoor temperature refers to a real-time indoor temperature of the room where the indoor unit of air conditioner is arranged measured at a sampling rate as the air conditioner running at heating mode; the indoor temperature could be obtained by those means already available to the public, such as using a temperature sensor disposed at or near the air inlet of the air conditioner to detect an inlet air temperature and using the inlet air temperature as the indoor temperature.

Then the indoor temperature is being compared with the first indoor temperature threshold, wherein the first indoor temperature threshold is used to determine whether or not to start executing a dual PID control process, which could be a default built-in inside the control program and proprietary for manufacturer or a set temperature point input from the user. If the user hopes to set the first indoor temperature threshold, the program could provide a recommended value for reference. Preferably, the preset first indoor temperature threshold or the recommended first indoor temperature threshold could be set as 20° C.

Step 12: Performing the dual PID control process if the indoor temperature is less than or equal to the first indoor temperature threshold.

Wherein the dual PID control process includes:

Calculating the difference between the indoor temperature and a set indoor target temperature to obtain a indoor temperature difference; performing a PID calculation according to the indoor temperature difference to obtain a first target frequency; wherein the indoor temperature specifically refers to the indoor temperature obtained in Step 11 and the set indoor target temperature is a desired temperature of the room environment set by the user; the specific indoor temperature PID algorithm to obtain the first target frequency could refer to those PID algorithms used in the prior art, with which the PID output controls the compressor speed through a variable frequency drive according to the room temperature demand.

In the meanwhile, obtaining the coil temperature of the heat exchanger within the indoor unit and calculating the temperature difference between the coil temperature and a coil target temperature to obtain a coil temperature difference; performing a PID calculation according to the coil temperature difference to obtain a second target frequency; wherein the coil temperature is a real-time temperature of the heat exchanger coil in the indoor unit, which is measured by a temperature sensor disposed on the heat exchanger at a set sampling rate. The coil target temperature is a desired value for the heat exchanger as the air conditioner being operated, which could be determined according to the indoor temperature obtained in Step 11, and the coil target temperature is negatively correlated with the indoor temperature in which the indoor temperature decreases as the coil target temperature increases; or the indoor temperature increases as the coil target temperature decreases. The specific coil temperature PID calculation algorithm to obtain the second target frequency could refer to the PID calculation algorithm used in the prior art in which the target frequency of the compressor is calculated according to room temperature; wherein an initial frequency of the coil temperature PID calculation is a preset initial frequency. Preferably, the initial frequency of the coil temperature PID calculation is the frequency of the compressor measured as the indoor temperature difference is being determined less than or equal to the first indoor temperature threshold to perform the dual PID control process.

Comparing the first target frequency obtained in the indoor temperature PID calculation with the second target frequency obtained in the coil temperature PID calculation; and performing the frequency control on the compressor in which the greater one between the first target frequency and the second target frequency is used as the target frequency.

According to the air conditioner heating mode control method disclosed by the present embodiment, if the indoor temperature is not greater than the first indoor temperature threshold, it indicates that the current room temperature is lower than the expected level and therefore it is preferably to select a higher target frequency between outputs of the indoor temperature PID calculation and the coil temperature PID calculation. In this way, on one hand, the compressor could run at a higher frequency as the indoor environment at comparatively low temperatures, with which the room could become warmer in a shorter time to a desired temperature; on the other hand, the aim of the control program could be set as a comparatively high set coil target temperature due to the negative correlation, which prevents the output air temperature from being far too low. Hence, with the control method, the problem that the room temperature could not reach the indoor requirements even it starts working for a long period or the low outlet air temperature could be solved. Additionally, based on the dual PID control process, even the user wrongly sets a low indoor target temperature under the condition that the environment temperature is far below desired temperature, the coil temperature PID calculation still could output an appropriate target frequency for the compressor to enable the room temperature to increase to a desired level which improves the heating performance of air conditioner. Moreover, the coil target temperature set in the coil temperature PID calculation is based on the indoor temperature and the two are negatively correlated: the lower the room temperature is measured, the higher the coil target temperature is set; if the indoor temperature is far from the desired temperature, the rate of temperature increase and outlet air temperature increase will be accelerated to enable the user to feel more comfort.

As preferred embodiments, the coil target temperature is determined according to the indoor temperature, which includes:

Obtaining a recommended indoor temperature and a recommended coil target temperature;

Calculating the difference between the recommended indoor temperature and the indoor temperature and setting the difference between the recommended indoor temperature and the indoor temperature as a first difference;

Obtaining a second difference, wherein the second difference is equal to the first difference multiplies a, namely the second difference=a* the first difference, wherein a is a positive number not greater than 1;

Calculating the sum of the recommended coil target temperature and the second difference, and the sum is set as the actual coil target temperature which is used in performing the coil temperature PID calculation.

Wherein the recommended indoor temperature is a known, pre-stored temperature, which is obtained by professionals through a large number of experimental tests and research and it indicates a comfort environment temperature considering human body comfort and the energy saving requirement of the air conditioner; as a preferred value, it could be set as 18° C. The recommended coil target temperature is also a known, pre-stored temperature, which is obtained by professionals through a large number of experimental tests and research and it assures that if the coil temperature reaches the recommended coil target temperature, after the heat exchange with the coil, the outlet air temperature would be in an appropriate range to make people feel warm and comfortable, as a preferred value, it could be set as 50° C. Both of the recommended indoor temperature and the recommended coil target temperature are proprietary for manufacturer which could be modified with authorization, such as the maintenance engineer is allowed to modify the two parameters in field. And a is a coefficient used for calculating the second difference which is also a known, pre-stored parameter. The coefficient α is obtained by professional through a large number of experimental tests and research, which is a positive number less than 1, as a preferred value, it could be set as 0.5. With those preferred parameters: the recommended indoor temperature is set as 18° C., the recommended coil target temperature is as 50° C. and the coefficient is set as 0.5, if the real-time indoor temperature is 16° C., the actual coil target temperature which is used in performing the coil temperature PID calculation is 51° C. according to the method disclosed above.

According to the above depicted method, as setting the coil target temperature according to the current indoor temperature, if the indoor temperature is lower than the recommended indoor temperature, it indicates that the current indoor temperature is far below the desired temperature; the first difference between the recommended indoor temperature and the indoor temperature is positive, and the second difference obtained according to the first difference is also positive, such that the actual coil target temperature calculated according to the sum of the recommended coil target temperature and the second difference would be greater than the recommended coil target temperature; and therefore, as performing the coil temperature PID calculation according to the actual coil target temperature, under the condition that the coil temperatures are equal, the output target frequency of the compressor would be higher due to the coil target temperature is greater. The higher target frequency further leads to a higher temperature increase rate. Moreover, the outlet air temperature is determined by the coil temperature, so it also increases to a high level and further enables the room temperature to reach to a desired value in a shorter time. The factors exert negative effects on heating performance: slow temperature increase and low outlet air temperature could be solved together, so as to enable the user feel more comfortable. Similarly, if the indoor temperature is greater than the recommended indoor temperature, it indicates that the current indoor temperature is not far below the desired temperature; the actual coil target temperature determined is less than the recommended coil target temperature. The target frequency determined by the actual coil target temperature is comparatively low and the compressor could be controlled running at the condition that the target frequency is determined by the actual coil target temperature, which could meet the requirement to create a comfort environment and reduce energy consumption in the meanwhile.

Figure 2:
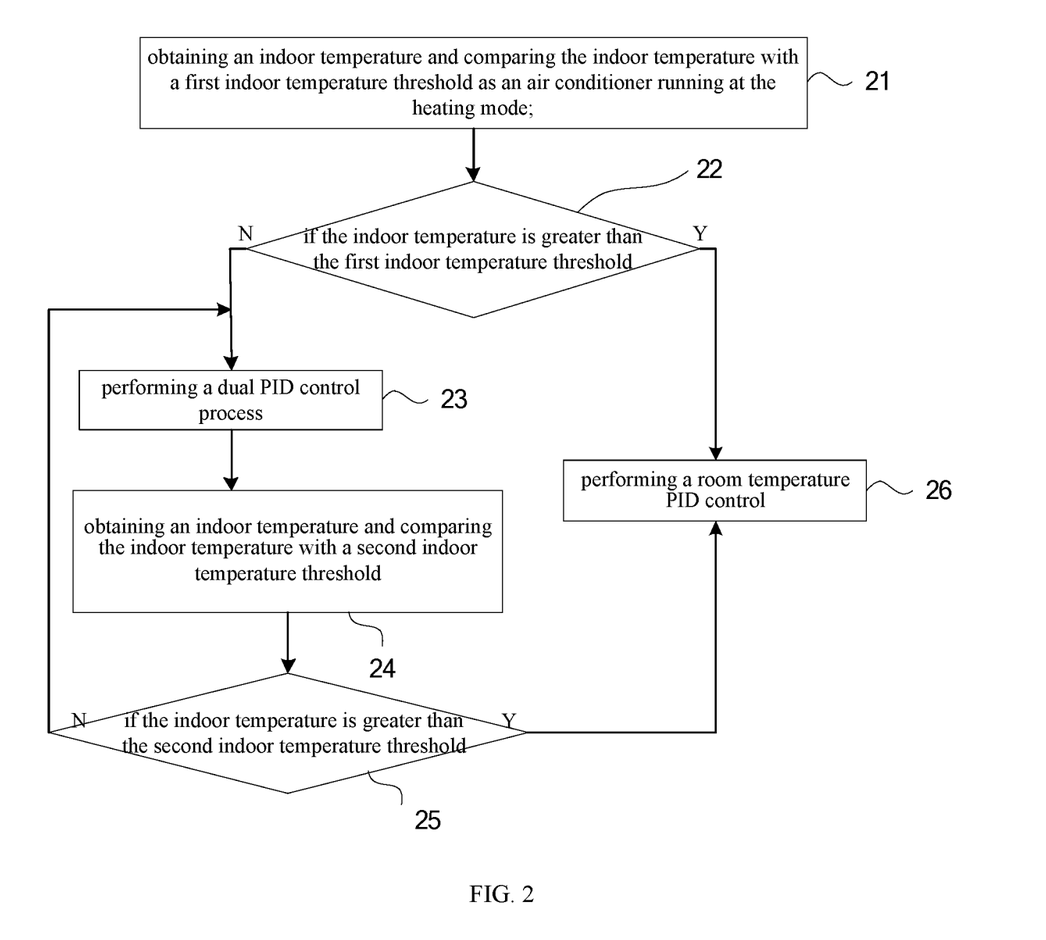
FIG. 2 is a flow chart of an air conditioner heating mode control method according to another embodiment of the present invention.

FIG. 2 is a flow chart of an air conditioner heating mode control method according to another embodiment of the present invention.

As shown in FIG. 2, the air conditioner heating mode control method includes:

Step 21: obtaining an indoor temperature and comparing the indoor temperature with a first indoor temperature threshold as an air conditioner running at the heating mode.

Wherein the indoor temperature refers to a real-time indoor temperature of the room where the indoor unit of air conditioner is arranged measured at a sampling rate as the air conditioner running at heating mode; the indoor temperature could be obtained by those means already available to the public, such as using a temperature sensor disposed at or near the air inlet of the air conditioner to detect an inlet air temperature and using the inlet air temperature as the indoor temperature.

Then the indoor temperature is being compared with the first indoor temperature threshold, wherein the first indoor temperature threshold is used to determine whether or not to start executing a dual PID control process, which could be a default built-in inside the control program and proprietary for manufacturer or a set temperature point input from the user. If the user hopes to set the first indoor temperature threshold, the program could provide a recommended value for reference. Preferably, the preset first indoor temperature threshold or the recommended first indoor temperature threshold could be set as 20° C.

Step 22: determining whether the indoor temperature is greater than the first indoor temperature threshold; if the indoor temperature is greater than the first indoor temperature threshold, then performing Step 26; otherwise performing Step 23.

Step 23: Performing a dual PID control process.

If in Step 22 it is determined that the indoor temperature is not greater than the first indoor temperature threshold, then performing the dual PID control process; the specific procedures of the dual PID control process could refer to the detailed description above about the embodiment shown in FIG. 1.

Step 24: obtaining an indoor temperature and comparing the indoor temperature with a second indoor temperature threshold.

To be specific it still needs to detect the real-time indoor temperature after the dual PID control process being executed and the real-time indoor temperature is being compared with a second indoor temperature threshold; wherein the second indoor temperature threshold is used to determine whether or not to terminate the dual PID control process, as the first indoor temperature threshold, the second indoor temperature threshold is a default built-in inside the control program and proprietary for manufacturer or a set temperature point input from the user. If the user hopes to set the second indoor temperature threshold, the program could provide a recommended value for reference. Preferably, the preset second indoor temperature threshold or the recommended second indoor temperature threshold could be set as 25° C.

Step 25: determining whether the indoor temperature is greater than the second indoor temperature threshold; if the indoor temperature is greater than the second indoor temperature threshold, performing Step 26; otherwise performing Step 23.

If the indoor temperature is less than or equal to the second indoor temperature threshold, then performing Step 23 and maintaining the dual PID control process working; but if the indoor temperature is greater than the second indoor temperature threshold, then terminating the dual PID control process and performing Step 26. The mandatory termination of the dual PID control process is to keep the compressor running at an appropriate frequency instead of a high frequency as the indoor temperature reach to a second indoor temperature which indicates a comparatively comfort state, and to prevent the compressor from stopping working as the room reaches the target temperature.

Step 26: Perform a room temperature PID control process.

Whether or not performing the Step 26 is determined by the output of Step 22 or the output of Step 25. To be specific, if in Step 22 it is determined that the real-time indoor temperature is greater than the first indoor temperature threshold before executing the dual PID control process, then performing a room temperature PID control process instead of the dual PID control process; that is to say, if the real-time indoor temperature is greater than the first indoor temperature threshold, it indicates that the real-time indoor temperature is comparatively low. Under this condition, the coil temperature weighed lightly. It is preferably to perform a typical indoor PID control process, which includes: calculating the difference between the indoor temperature and a set indoor target temperature to obtain the indoor temperature difference; performing an indoor temperature PID calculation according to the indoor temperature difference to obtain a first target frequency; performing the frequency control on the compressor in which the first target frequency is used as the target frequency. If in Step 25 it is determined that the real-time indoor temperature is greater than the second indoor temperature threshold in performing the dual PID control process, terminating the dual PID control process and starting executing the room PID control process, that is to say, if the real-time indoor temperature is greater than the second indoor temperature threshold in the dual PID control process, the coil temperature is weighed lightly in order to prevent the compressor from stopping working as the room reach the target temperature and the typical room temperature PID control process is being performed, which includes: calculating the difference between the indoor temperature and a set indoor target temperature to obtain the indoor temperature difference; performing an indoor temperature PID calculation according to the indoor temperature difference to obtain a first target frequency; performing the frequency control on the compressor in which the first target frequency is used as the target frequency.

Other effects achieved by the air conditioner heating mode control method shown in FIG. 2 could refer to the detailed description above accompanying the FIG. 1.

Figure 3:
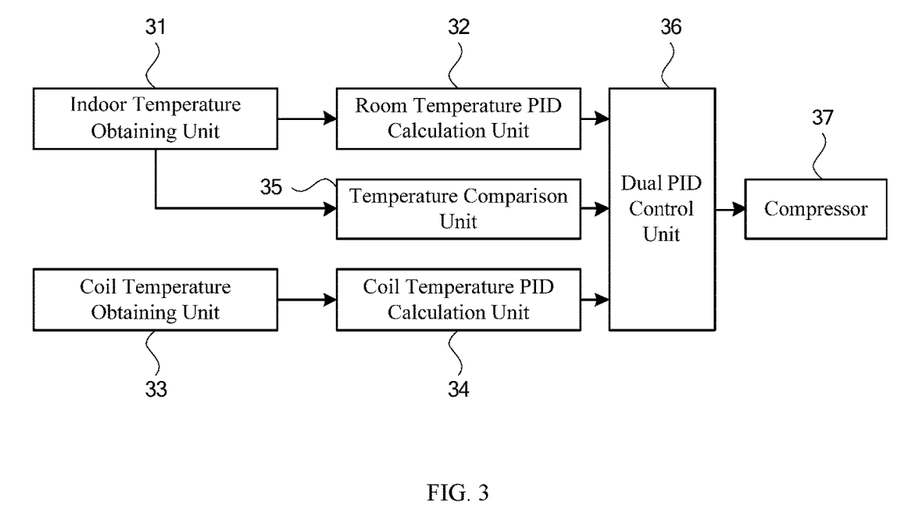
FIG. 3 is a block diagram showing an air conditioner heating mode control device according to an embodiment of the present invention.

FIG. 3 is a block diagram showing an air conditioner heating mode control device according to an embodiment of the present invention.

The air conditioner heating mode control device shown in FIG. 3 includes:

An indoor temperature obtaining unit 31, wherein the indoor temperature obtaining unit is configured to obtain an indoor temperature;

A room temperature PID calculation unit 32, wherein the room temperature PID calculation is configured to calculate the temperature difference between the indoor temperature obtained by the indoor temperature obtaining unit 31 and a set indoor target temperature to obtain an indoor temperature difference; and to perform a room temperature PID calculation according to the indoor temperature difference to obtain and output a first target frequency;

A coil temperature obtaining unit 33, wherein the coil temperature obtaining unit is configured to obtain a coil temperature of the heat exchanger within the indoor unit of the air conditioner;

A coil temperature PID calculation unit 34, wherein the coil temperature PID calculation unit is configured to calculate a temperature difference between the coil temperature obtained by the coil temperature obtaining unit 33 and a coil target temperature to obtain a coil temperature difference; and to perform a coil temperature PID calculation according to the coil temperature difference to obtain and output a second target frequency; and moreover, the coil target temperature is determined according to the indoor temperature: the coil target temperature is negatively correlated with the indoor temperature;

A temperature comparison unit 35, wherein the temperature comparison unit is configured to compare the indoor temperature obtained by the indoor temperature obtaining unit with an indoor temperature threshold and output a comparison result.

A dual PID control unit 36, wherein the dual PID control unit is configured to perform a frequency control on the compressor 37 of the air conditioner in which the greater one between the first target frequency output by the indoor temperature PID calculation unit 32 and the second target frequency output by the coil temperature PID calculation unit 34 is used as the target frequency for the compressor as the output of the temperature comparison unit 35 is that the indoor temperature is not greater than a first indoor temperature threshold.

As preferred embodiments, the air conditioner heating mode control device further includes:

A recommended indoor temperature obtaining unit, wherein the recommended indoor temperature obtaining unit is configured to obtain a recommended indoor temperature;

A recommended coil target temperature obtaining unit, wherein the recommended coil target temperature obtaining unit is configured to obtain a recommended coil target temperature;

A first difference calculation unit, wherein the first difference calculation unit is configured to obtain a first difference which is the temperature difference between the recommended indoor temperature and the indoor temperature;

A second difference calculation unit, wherein the second difference calculation unit is configured to obtain a second difference according to a relation in which the second difference=a* the first difference, wherein a is a positive number not greater than 1;

A coil target temperature determining unit, wherein the coil target temperature determining unit is configured to calculate the sum of the recommended coil target temperature and the second difference and set the sum of the recommended coil target temperature and the second difference as an actual coil target temperature for performing the coil temperature PID calculation; and output the actual coil target temperature to the coil temperature PID calculation unit.

Figure 4:
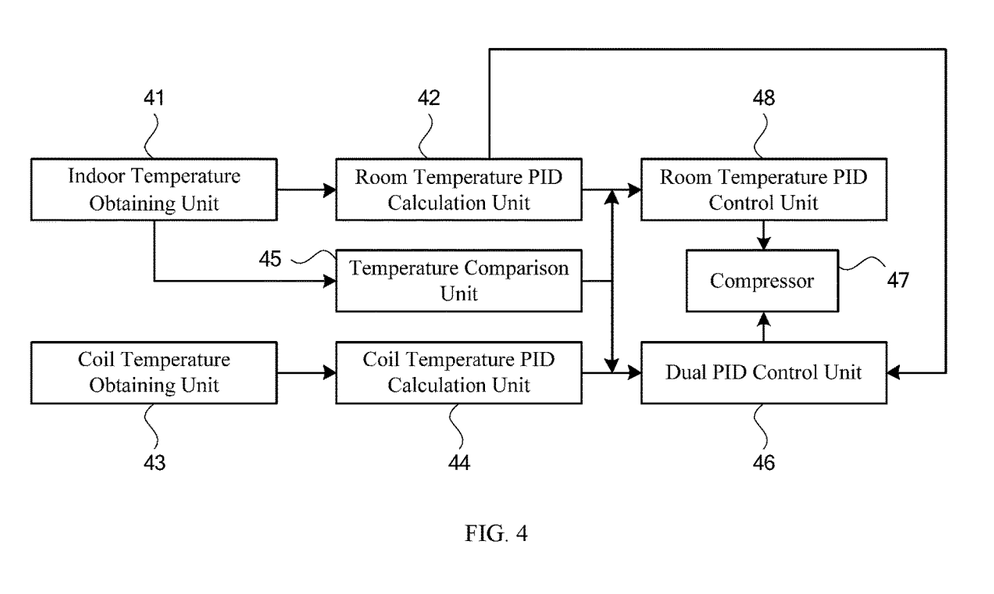
FIG. 4 is a block diagram showing an air conditioner heating mode control device according to another embodiment of the present invention.

The air conditioner heating mode control device could be applied in an air conditioner to execute corresponding control logic as shown in FIG. 1 based on software, in order to solve the problems of slow temperature increase rate and low outlet air temperature, and enable the user feel more comfortable. FIG. 4 is a block diagram showing an air conditioner heating mode control device according to another embodiment of the present invention.

The air conditioner heating mode control device shown in FIG. 4 includes:

An indoor temperature obtaining unit 41, wherein the indoor temperature obtaining unit is configured to obtain an indoor temperature;

A room temperature PID calculation unit 42, wherein the room temperature PID calculation is configured to calculate the temperature difference between the indoor temperature obtained by the indoor temperature obtaining unit 41 and a set indoor target temperature; and to perform a room temperature PID calculation according to the indoor temperature difference to obtain and output a first target frequency;

A coil temperature obtaining unit 43, wherein the coil temperature obtaining unit is configured to obtain a coil temperature of the heat exchanger within the indoor unit of the air conditioner;

A coil temperature PID calculation unit 44, wherein the coil temperature PID calculation unit is configured to calculate a temperature difference between the coil temperature obtained by the coil temperature obtaining unit 43 and a coil target temperature to obtain a coil temperature difference; and to perform a coil temperature PID calculation according to the coil temperature difference to obtain and output a second target frequency; and moreover, the coil target temperature is determined according to the indoor temperature: the coil target temperature is negatively correlated with the indoor temperature;

A temperature comparison unit 45, wherein the temperature comparison unit is configured to compare the indoor temperature obtained by the indoor temperature obtaining unit with an indoor temperature threshold and output a comparison result.

A dual PID control unit 46, wherein the dual PID control unit is configured to perform a frequency control on the compressor 47 of the air conditioner in which the greater one between the first target frequency output by the indoor temperature PID calculation unit 42 and the second target frequency output by the coil temperature PID calculation unit 44 is used as the target frequency for the compressor as the output of the temperature comparison unit 45 is that the indoor temperature is not greater than a first indoor temperature threshold.

A room temperature PID control unit 48, wherein the room temperature PID control unit is configured to perform a frequency control on the compressor in which the first target frequency output by the indoor temperature PID calculation unit 42 is set as the target frequency if it is determined by the temperature comparison unit 45 that the indoor temperature is greater than the first indoor temperature threshold before the dual PID control unit 46 performing the dual PID control process; the room temperature PID control unit is also configured to perform a frequency control on the compressor in which the first target frequency output by the indoor temperature PID calculation unit 42 is set as the target frequency if it is determined by the temperature comparison unit 45 that the indoor temperature is greater than the second indoor temperature threshold and the dual PID control unit 46 terminates; wherein as the dual PID control unit 46 performing the dual PID control process, the indoor temperature obtaining unit 41 keeps obtaining the indoor temperature and outputs to the temperature comparison unit 45.

The air conditioner heating mode control device could be applied in an air conditioner to execute corresponding control logic as shown in FIG. 2 based on software, in order to solve the problems of slow temperature increase rate and low outlet air temperature, and enable the user feel more comfortable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An air conditioner heating mode control method, the method, enabled by a processor, a memory and sensors, comprising:
    obtaining an indoor temperature and comparing the indoor temperature with a first indoor temperature threshold as an air conditioner running at the heating mode; performing a dual proportional-integral-derivative (PID) control process if the indoor temperature is less than or equal to the first indoor temperature threshold;
    wherein the dual PID control process including:
    calculating the difference between the indoor temperature and a set indoor target temperature to obtain an indoor temperature difference;
    performing a PID calculation according to the indoor temperature difference to obtain a first target frequency;
    obtaining a coil temperature of an indoor unit heat exchanger;
    calculating the temperature difference between the coil temperature and a coil target temperature to obtain a coil temperature difference;
    performing a PID calculation according to the coil temperature difference to obtain a second target frequency;
    comparing the first target frequency obtained in the indoor temperature PID calculation with the second target frequency obtained in the coil temperature PID calculation; and performing a frequency control on the compressor in which the greater one between the first target frequency and the second target frequency is used as the target frequency;
    wherein the coil target temperature is determined according to the indoor temperature, wherein the coil target temperature is negatively correlated with the indoor temperature in which the indoor temperature decreases as the coil target temperature increases; or the indoor temperature increases as the coil target temperature decreases;
    the method being further comprising:
    during the dual PID control process further includes:
    obtaining the indoor temperature in real time;
    comparing the indoor temperature with a second indoor temperature threshold; wherein the second indoor temperature threshold is greater than the first indoor temperature threshold;
    if the indoor temperature is greater than the second indoor temperature threshold, terminating the dual PID control process;
    the method being further characterized in that:
    performing a room temperature PID control as the dual PID control process is being terminated;
    wherein the room temperature PID control process includes:
    performing a frequency control on the compressor in which the first target frequency is used as the target frequency.

2. The control method according to claim 1, further comprising:
    performing a room temperature PID control process if the indoor temperature is greater than the first indoor temperature threshold;
    wherein the room temperature PID control process includes:
    performing a frequency control on the compressor in which the first target frequency is used as the target frequency.

3. The control method according to claim 1, further comprising:
    determining the coil target temperature according to the indoor temperature including:
    obtaining a recommended indoor temperature and a recommended coil target temperature;
    calculating the difference between the recommended indoor temperature and the indoor temperature to obtain a first difference;

obtaining a second difference according to a relation: the second difference=a * the first difference, wherein a is a positive number not greater than 1;

calculating the sum of the recommended coil target temperature and the second difference as the coil target temperature for performing the coil temperature PID calculation.

4. An air conditioner heating mode control device, comprising:

a processor and a memory operably connected with an indoor temperature obtaining unit, a coil temperature obtaining unit, a room temperature PID calculation unit, a coil temperature PID calculation unit, a temperature comparison unit and a dual PID control unit;

the indoor temperature obtaining unit configured to obtain an indoor temperature;

the coil temperature obtaining unit configured to obtain a coil temperature of an indoor unit heat exchanger;

the room temperature proportional-integral-derivative (PID) calculation unit configured to calculate the temperature difference between the indoor temperature and a set indoor target temperature to obtain an indoor temperature difference; and to perform a room temperature PID calculation according to the indoor temperature difference to obtain and output a first target frequency;

the coil temperature PID calculation unit configured to calculate a temperature difference between the coil temperature and a coil target temperature to obtain a coil temperature difference; and to perform a coil temperature PID calculation according to the coil temperature difference to obtain and output a second target frequency; the coil target temperature is determined according to the indoor temperature; the coil target temperature is negatively correlated with the indoor temperature in which the indoor temperature decreases as the coil target temperature increases; or the indoor temperature increases as the coil target temperature decreases;

the temperature comparison unit configured to compare the indoor temperature with an indoor temperature threshold; and the dual PID control unit configured to perform a frequency control on the compressor in which the greater one between the first target frequency and the second target frequency is set as the target frequency for the compressor as the output of the temperature comparison unit is that the indoor temperature is not greater than a first indoor temperature threshold;

wherein,
the dual PID control unit performing the dual PID control process, the indoor temperature obtaining unit keeps obtaining the indoor temperature; if the output of the temperature comparison unit is that the indoor temperature is greater than the second indoor temperature threshold, the dual PID control unit terminates; wherein the second indoor temperature threshold is greater than the first indoor temperature threshold; and wherein,
the room temperature PID calculation unit is configured to perform a frequency control on the compressor in which the first target frequency is set as the target frequency for the compressor as the output of the temperature comparison unit is that the indoor temperature is greater than the second indoor temperature threshold and the dual PID control unit is being terminated.

5. The control device according to claim 4, further comprising:

a room temperature PID control unit configured to perform a frequency control on the compressor in which the first target frequency is set as the target frequency for the compressor as the output of the temperature comparison unit is that the indoor temperature is greater than the first indoor temperature threshold.

6. The control device according to claim 4, further comprising:

a recommended indoor temperature obtaining unit configured to obtain a recommended indoor temperature;

a recommended coil target temperature obtaining unit configured to a recommended coil target temperature;

a first difference calculation unit configured to obtain a first difference which is the temperature difference between the recommended indoor temperature and the indoor temperature;

a second difference calculation unit configured to obtain a second difference according to a relation in which the second difference=a* the first difference, wherein a is a positive number not greater than 1; and a coil target temperature determining unit configured to calculate the sum of the recommended coil target temperature and the second difference and set the sum of the recommended coil target temperature and the second difference as the coil target temperature for performing the coil temperature PID calculation; and output the coil target temperature to the coil temperature PID calculation unit.

* * * * *